United States Patent [19]

Kushi et al.

[11] Patent Number: 5,099,942

[45] Date of Patent: Mar. 31, 1992

[54] TRACTION CONTROL DEVICE FOR A VEHICLE

[75] Inventors: Naoto Kushi; Toshio Takaoka, both of Toyota, Japan

[73] Assignee: Toyota Jidosha Kabushiki Kaisha, Toyota, Japan

[21] Appl. No.: 493,916

[22] Filed: Mar. 15, 1990

[30] Foreign Application Priority Data

Mar. 17, 1989 [JP] Japan .................................. 1-66834

[51] Int. Cl.⁵ ............................................ B60K 31/00
[52] U.S. Cl. .................................... 180/197; 123/333; 123/481; 364/426.03
[58] Field of Search .................. 180/197, 76; 123/198 DB, 332, 333, 351, 478, 481; 364/426.03

[56] References Cited

U.S. PATENT DOCUMENTS

| | | | |
|---|---|---|---|
| 3,684,047 | 8/1972 | Zeisloft et al. | 180/197 |
| 3,938,612 | 2/1976 | Boudeville et al. | 180/197 |
| 4,432,430 | 2/1984 | Lind et al. | 180/197 |
| 4,721,176 | 1/1988 | Kobasin et al. | |
| 4,739,856 | 4/1988 | Inagaki et al. | 180/197 |
| 4,766,972 | 8/1988 | Takata et al. | 180/197 |
| 4,856,610 | 8/1989 | Leiber et al. | 180/197 |
| 4,860,847 | 8/1989 | Shiraishi et al. | 180/197 |
| 4,860,849 | 8/1989 | Andersson et al. | 180/197 |
| 4,917,208 | 4/1990 | Komoda | 180/197 |
| 4,959,794 | 9/1990 | Shiraishi et al. | 180/197 X |

FOREIGN PATENT DOCUMENTS

| | | |
|---|---|---|
| 20270313 | 6/1988 | European Pat. Off. . |
| 13028916 | 2/1981 | Fed. Rep. of Germany . |
| 0151160 | 8/1985 | Japan .................. 180/197 |
| 0060462 | 3/1989 | Japan .................. 180/197 |
| 1425220 | 2/1976 | United Kingdom . |
| 2157028 | 10/1985 | United Kingdom . |

OTHER PUBLICATIONS

Copending U.S. patent application Ser. No. 307,946 (Filing date Feb. 9, 1989).

Primary Examiner—Charles A. Marmor
Assistant Examiner—Alan M. Kagen
Attorney, Agent, or Firm—Kenyon & Kenyon

[57] ABSTRACT

A traction control device comprising a cylinder number determining device for determining the number of cylinders to which the supply of fuel is to be stopped, in accordance with the speed difference between a rotating speed of a free running wheel and a rotating speed of a driven wheel. A change of an actual number of cylinders to which the supply of fuel is actually stopped by a fuel stop controlling device is prohibited until a predetermined time has elapsed from a time at which the actual number of cylinders was changed.

13 Claims, 12 Drawing Sheets

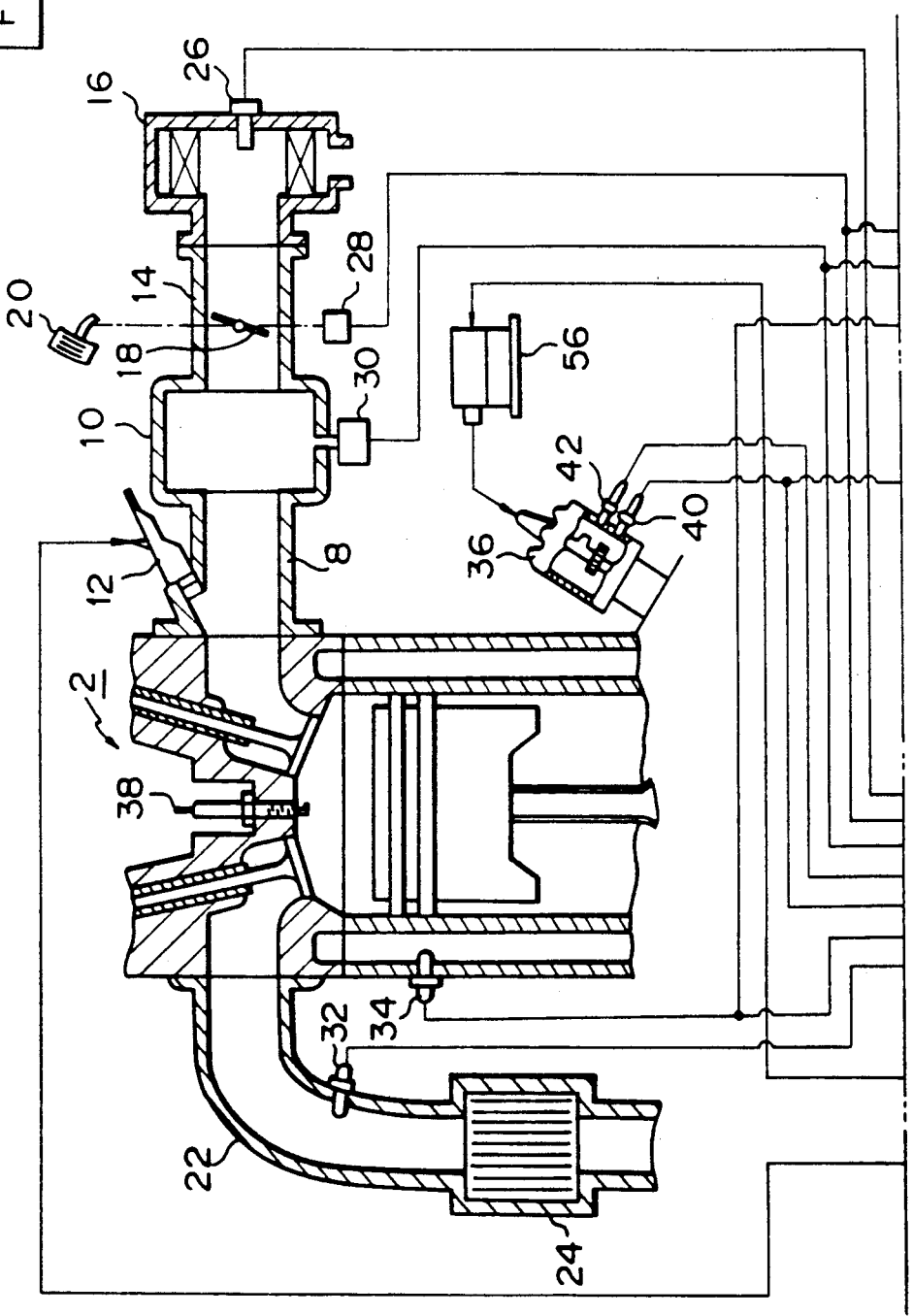

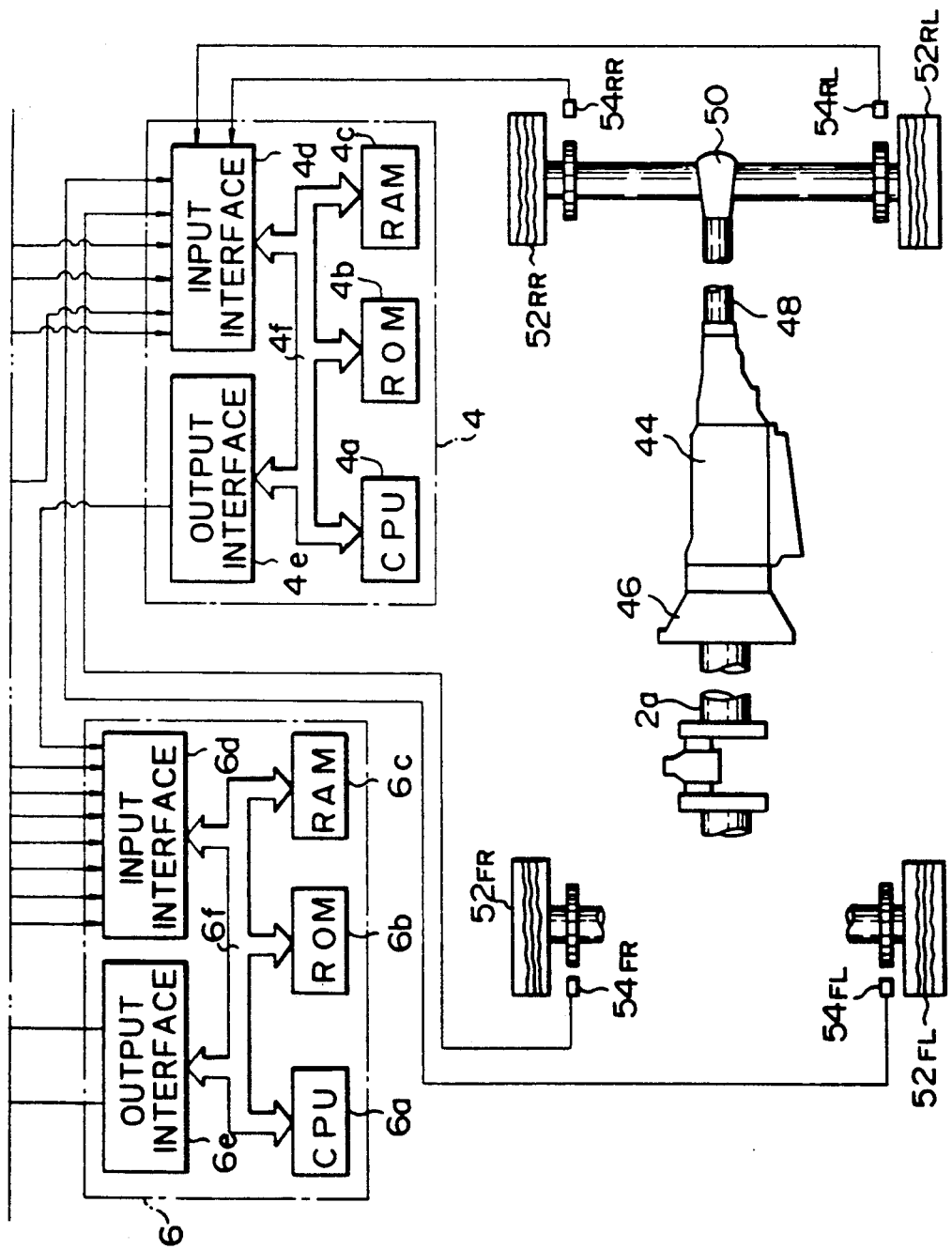

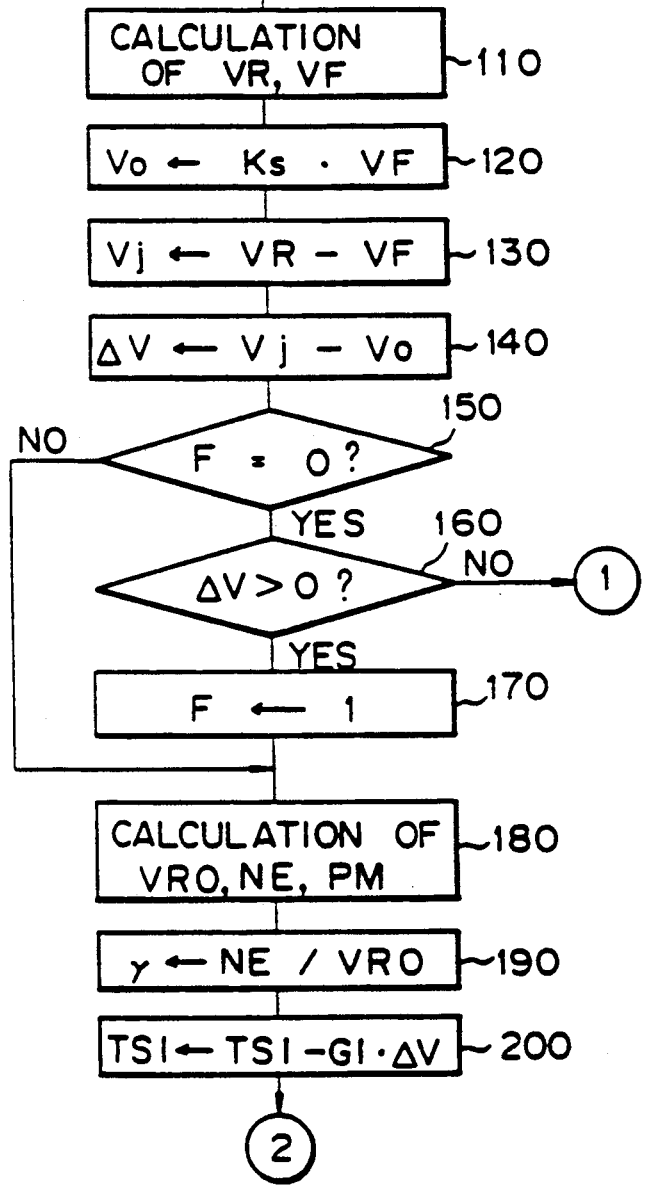

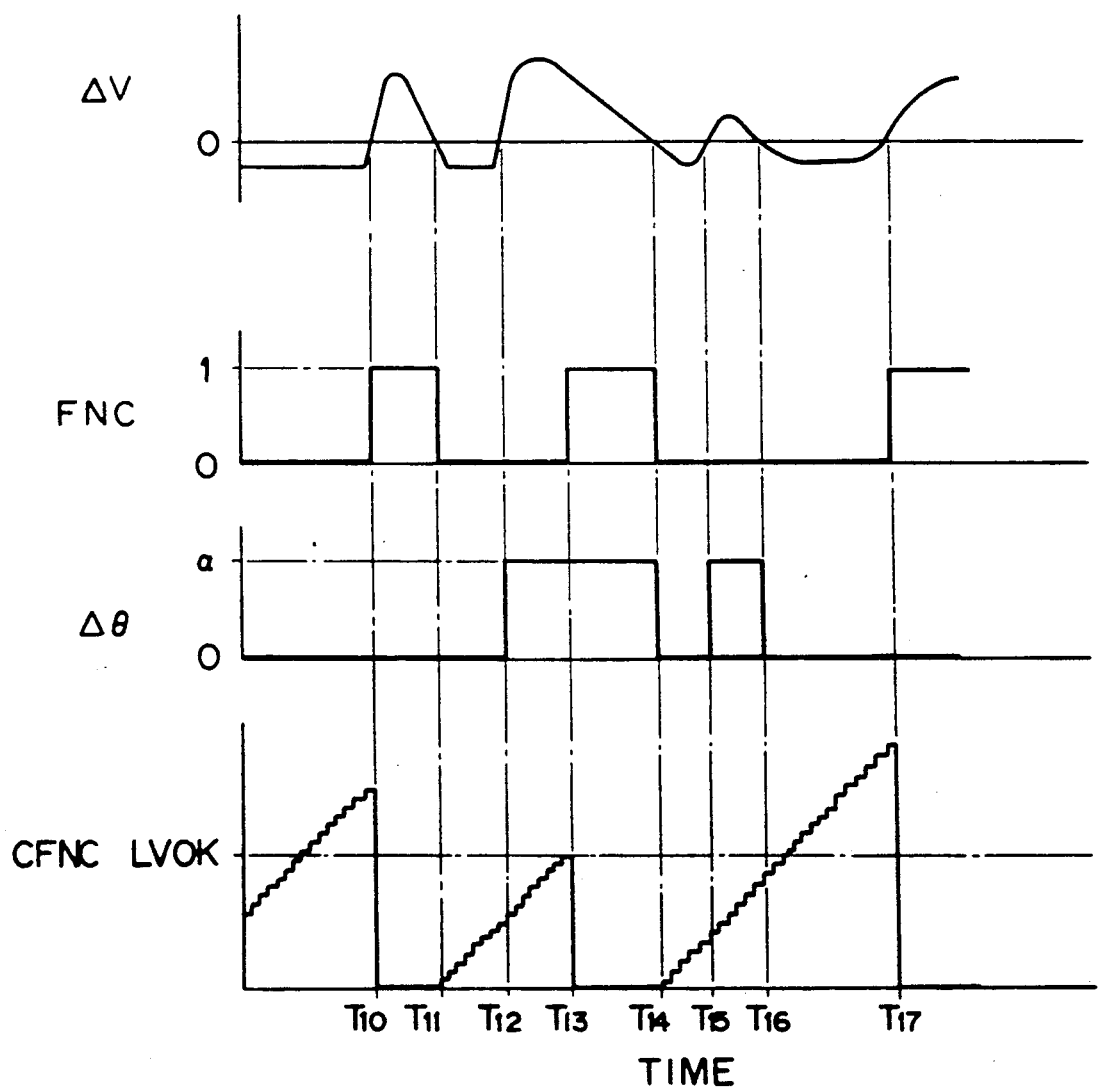

TRACTION CONTROL DEVICE FOR A VEHICLE

BACKGROUND OF THE INVENTION

1. Field of the Invention

The present invention relates to a traction control device for a vehicle.

2. Description of the Related Art

In a known engine, when the engine is accelerated, the occurrence of slippage of the driven wheel is detected by the difference between the speed of rotation of the free running wheel and the speed of rotation of the driven wheel, and when slippage of the driven wheel occurs, the output torque of the engine is reduced by stopping the supply of fuel fed to some of the engine cylinders (see Japanese Unexamined Patent Publication No. 58-8436). In this engine, the number of the engine cylinders in which the supply of fuel is stopped is increased as the slippage of the driven wheel becomes greater, and thus the output torque of the engine is controlled in accordance with the severity of the slippage.

However, when the severity of the slippage fluctuates within a relatively short time, the number of engine cylinders in which the supply of fuel is stopped fluctuates within a relatively short time, and accordingly, the supply of fuel and the prohibition of the supply of fuel to the engine cylinders are alternatively repeated at a high frequency.

When the prohibition of the supply of fuel for the engine cylinder is started, fuel accumulated on the inner wall of an intake manifold gradually flows into the engine cylinders in which the supply of fuel is stopped. Therefore, when the supply of fuel and prohibition of the supply of fuel to the cylinders are alternatively repeated at a high frequency, a large amount of unburned HC is discharged into the exhaust passage. Furthermore, if the supply of fuel for the engine cylinder is prohibited, a large amount of oxygen is discharged into the exhaust passage from the engine cylinders, and consequently, since a large amount of unburned HC is burned in the exhaust passage, a problem arises in that parts of the exhaust system, for example, the catalyst, are damaged due to the heat from the burning of the unburned HC.

In addition, where the supply of fuel and prohibition of the supply of fuel to the cylinders are alternatively repeated at a high frequency, when the supply of fuel for the engine cylinder is started, since a large amount of fuel adheres to an intake port, the amount of fuel fed into the cylinder in which the supply of fuel is started is small. Therefore, the burning time becomes long and continues until next intake stroke in the cylinder. Consequently, when the intake valve is opened, the burning gas flows back to the intake manifold, and thus a problem arises in that an air-fuel mixture in an intake pipe is ignited and burned, i.e., a backfire occurs.

SUMMARY OF THE INVENTION

An object of the present invention is to provide a traction control device capable of obtaining a good traction control and capable of preventing damage to parts of the exhaust system as well as the occurrence of backfiring.

According to the present invention, there is provided a traction control device of a vehicle having a free running wheel and a driven wheel driven by an engine having a plurality of cylinders, a fuel supply device for the cylinders and an ignition device for the cylinders, the traction control device comprising; means for detecting the rotating speed of the free running wheel; means for detecting the rotating speed of the driven wheel; speed difference calculating means for calculating a speed difference between the rotating speed of the free running wheel and the rotating speed of the driven wheel; cylinder number determining means for determining the number of cylinders in which the supply of fuel is to be stopped, in accordance with said speed difference; fuel supply controlling means for controlling the supply of fuel to the cylinders in accordance with the determined number of cylinders; and prohibiting means for prohibiting a change in an actual number of the cylinders in which the supply of fuel is actually stopped by the fuel supply controlling means, until a predetermined time has elapsed from a time at which the actual number of cylinders was changed.

The present invention may be more fully understood from the description of preferred embodiments of the invention set forth below, together with the accompanying drawings.

BRIEF DESCRIPTION OF THE DRAWINGS

In the drawings:

FIG. 1 is a schematic cross-sectional view of an engine;

FIG. 10 is a time chart showing changes in the speed difference $\Delta V$, the fuel supply stopping flag FNC, the retarding of the ignition timing $\Delta \theta$, and the timer counter CFNC.

DESCRIPTION OF THE PREFERRED EMBODIMENTS

Figure 2:
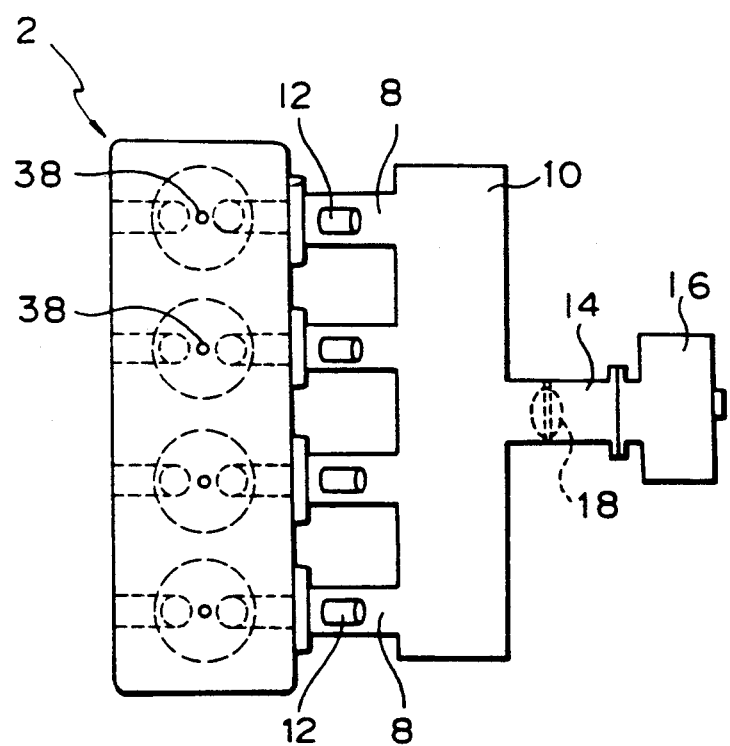
FIG. 2 is a plan view of the engine illustrated in FIG. 1.

FIGS. 1 and 2 illustrates a case wherein the present invention is applied to a vehicle using a front engine-rear drive system.

Referring to FIGS. 1 and 2, 2 designates a four-cylinder engine, 4 a first electronic control unit for calculating various control quantities used for controlling the output torque of the engine 2, and 6 a second electronic control unit for executing the controls of the fuel injection and the ignition timing on the basis of signals output from the first electronic control unit 4. The cylinders of the engine 2 are connected to a surge tank 10 via corresponding branches 8, and fuel injectors 12 are mounted on the corresponding branches 8. The surge tank 10 is connected to an air cleaner 16 via an intake duct 14, and a throttle valve 18 connected to an accelerator pedal 20 is arranged in the intake duct 14. In addition, the cylinders of the engine are connected to a three way catalytic converter 24 via an exhaust manifold 22.

The first electronic control unit 4 is constructed as a digital computer and comprises a CPU (microprocessor, etc.) 4a, a ROM (read only memory) 4b, a RAM (random access memory) 4c, an input interface 4d and an output interface 4c. The CPU 4a, the ROM 4b, the RAM 4c, the input interface 4d and the output interface 4e are interconnected via a bidirectional bus 4f.

The second electronic control unit 6 is also constructed as a digital computer and comprises a CPU 6a, a ROM 6b, a RAM 6c, an input interface 6d and an output interface 6e. The CPU 6a, the ROM 6b, the RAM 6c, the input interface 6d and the output interface 6e are interconnected via a bidirectional bus 6f.

An air temperature sensor 26 producing an output voltage proportional to the temperature of the air is arranged in the air cleaner 16, and the output voltage of the air temperature sensor 26 is input to the input interface 6d. A throttle sensor 28 producing an output voltage proportional to the degree of opening of the throttle valve 14 is attached to the throttle valve 14, and the output voltage of the throttle sensor 28 is input to the input interfaces 4d and 6d. A pressure sensor 30 producing an output voltage proportional to the absolute pressure in the surge tank 10 is attached to the surge tank 10, and the output voltage of the pressure sensor 30 is input to the input interfaces 4d and 6d. An oxygen concentration detector 32 producing an output voltage which is abruptly changed at the stoichiometric air-fuel ratio is arranged in the exhaust manifold 22, and the output voltage of the oxygen concentration detector 32 is input to the input interface 6d. A coolant temperature sensor 34 producing an output voltage proportional to the temperature of the engine coolant is mounted on the body of the engine 2, and the output voltage of the coolant temperature sensor 34 is input to the input interfaces 4d and 6d. Further, a distributor 36 is mounted on the body of the engine 2 to distribute an ignition current to spark plugs 38, and a crankangle sensor 40 and a cylinder discriminating sensor 42 are arranged in the distributor 36. The crankangle sensor 40 produces an output pulse at each revolution by 30 degrees of the crankshaft 2a of the engine 2, and these output pulses are input to the input interfaces 4d and 6d. The engine speed is calculated from these output pulses in the electronic control units 4 and 6. The cylinder discriminating sensor 42 produces an output pulse at each two revolutions of the crankshaft 2a, and thus which fuel injector 12 and spark plug 38 is to be operated can be determined from this output signal.

As illustrated in FIG. 1, the crankshaft 2a of the engine 2 is connected to an automatic transmission 44 via a torque converter 46, and the output shaft 48 of the automatic transmission 44 is connected to rear wheels 52RR and 52RL via a differential gear 50. Therefore, in the embodiment illustrated in FIG. 1, the rear wheels 52RR and 52RL are driven wheels and the front wheels 52FR and 52RL are free running wheels. A driven wheel speed sensor 54RR is provided for the driven wheel 52RR and produces an output pulse at each revolution by a predetermined angle of the driven wheel RR, and these output pulses of the sensor 54RR are input to the input interface 4d. The rotating speed of the driven wheel 52RR is calculated from these output pulses by the electronic control unit 4. Another driven wheel speed sensor 54RL is provided for the driven wheel 52RL and produces an output pulse at each revolution by a predetermined angle of the driven wheel 52RL, and these output pulses of the sensor 54RL are input to the input interface 4d. The rotating speed of the driven wheel 52RL is calculated from these output pulses by the electronic control unit 4. Further, a free running wheel speed sensor 54FR is provided for the free running wheel 52FR and produces an output pulse at each revolution by a predetermined angle of the free running wheel 52FR, and these output pulses of the sensor 54FR are input to the input interface 4d. The rotating speed of the free running wheel 52FR is calculated from these output pulses by the electronic control unit 4. Another free running wheel speed sensor 54FL is provided for the free running wheel 52FL and produces an output pulse at each revolution by a predetermined angle of the free running wheel 52FL, and these output pulses of the sensor 54FL are input to the input interface 4d. The rotating speed of the free running wheel 52FL is calculated from these output pulses by the electronic control unit 4.

The output interface 4e of the first electronic control unit 4 is connected to the input interface 6d of the second electronic control unit 6, and the output interface 6e of the second electronic control unit 6 is connected, on one hand, to the fuel injectors 12, and on the other hand, to the distributor 36 via an ignitor 56.

Figure 3B:
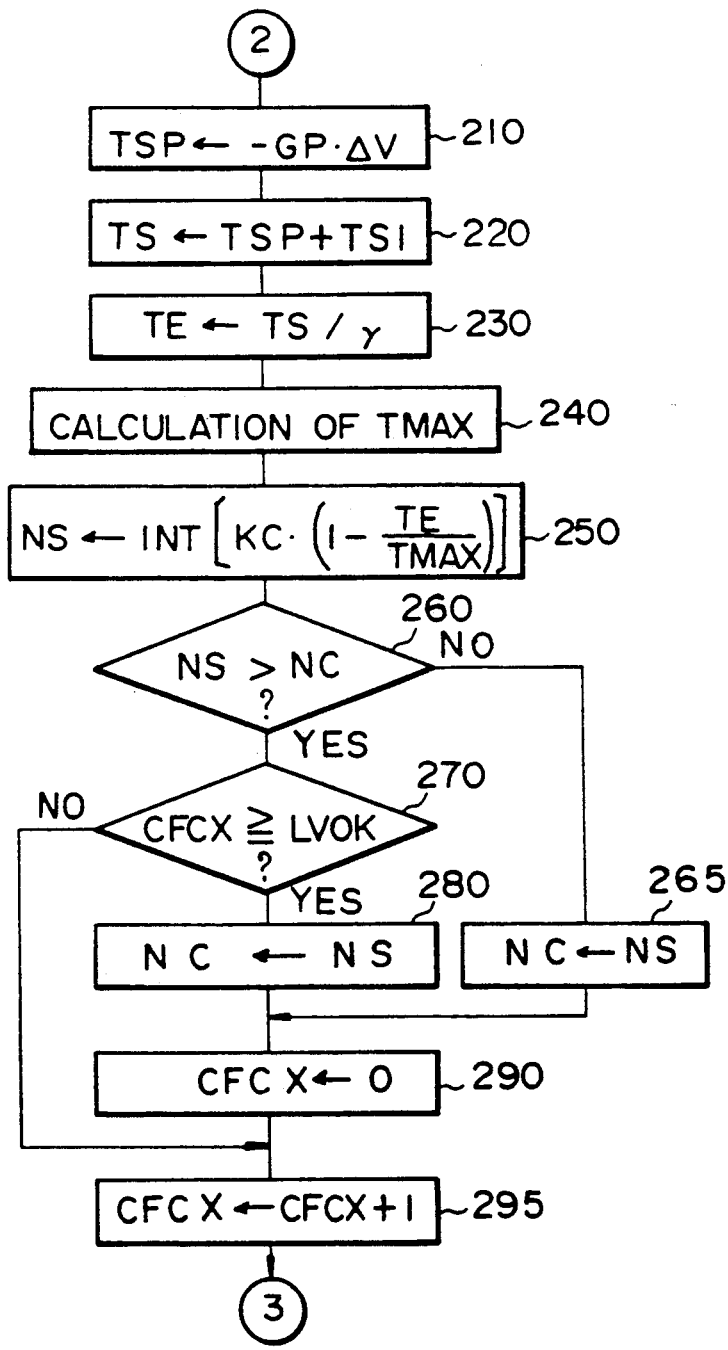
FIG. 3 is a flow chart of the first embodiment for executing the acceleration slippage control.
Figure 3C:
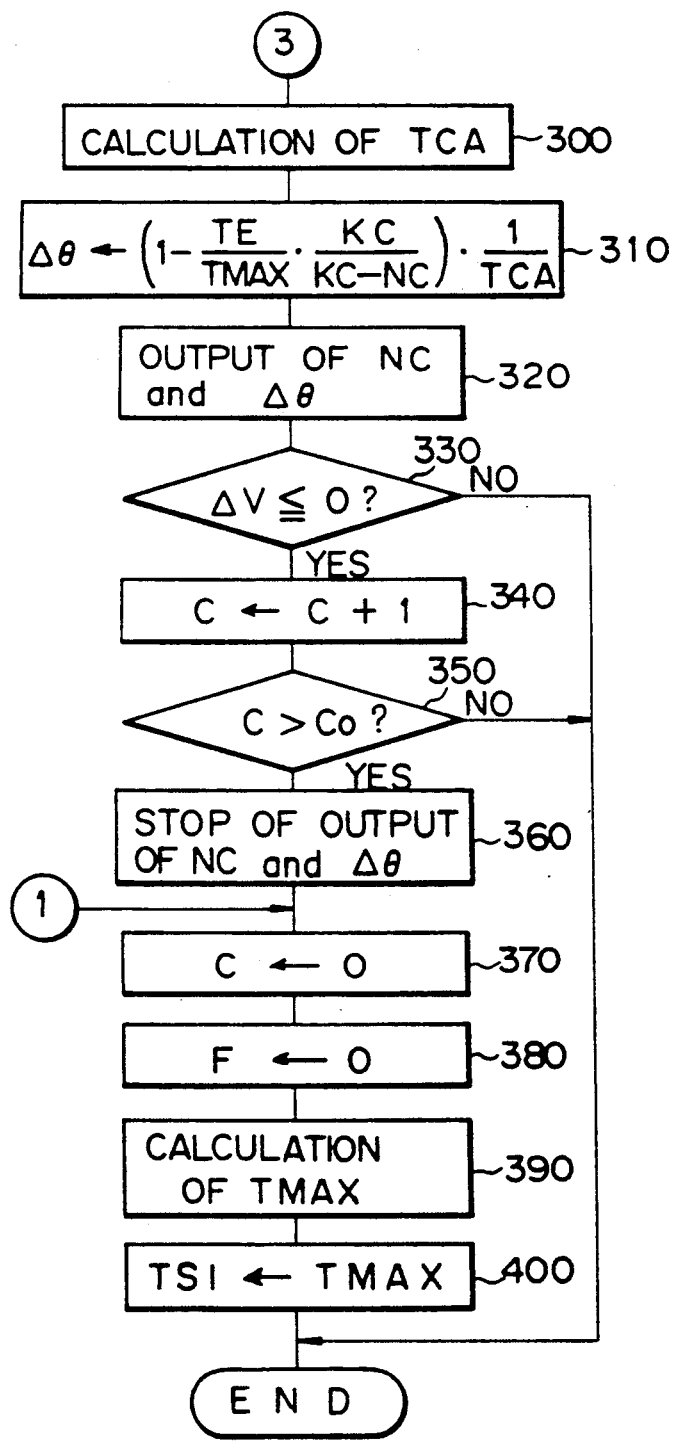

FIG. 3 illustrates a routine for executing the acceleration slippage control of a first embodiment of the present invention, and this routine is processed by sequential interruptions executed at predetermined intervals in the first electronic control unit 4.

Referring to FIG. 3, in step 110, the apparent vehicle speed VR and the actual vehicle speed VF are calculated from the output signals of the speed sensors 54RR, 54RL, 54FR and 54FL. In this embodiment, a higher of the rotating speeds of the driven wheels 52RR and 52RL is memorized as the apparent vehicle speed VR, and a higher of the rotating speeds of the free running wheels 52FR and 52FL is memorized as the actual vehicle speed VF. Then, in step 120, a target slippage amount $V_O$ of the driven wheels 52RR and 2RL is calculated by multiplying the actual vehicle speed VF by a predetermined target slippage rate Ks (for example 0.1). Then, in step 130, the actual slippage amount VJ is calculated by subtracting the actual vehicle speed VF from the apparent vehicle speed VR, and in step 140, the speed difference $\Delta V$ between the actual slippage amount VJ and the target slippage amount $V_O$ is calculated. In this embodiment, when the actual slippage amount VJ exceeds the target slippage amount $V_O$, i.e., when $\Delta V$ is positive, the acceleration slippage control is carried out.

Then, in step 150, it is determined whether or not a flag F indicating that the acceleration slippage control has been carried out is set. When the flag F is reset, i.e., when the acceleration slippage control is not carried out, the routine goes to step 160 and it is determined whether or not the speed difference $\Delta V$ is positive. If $\Delta V \leq 0$, it is determined that the slippage of the driven wheels 52RR or 52RL has not occurred, and the routine jumps to step 370. In step 370, the counter C is cleared, and then in step 380 the flag F is reset. Then, in step 390, the maximum torque TMAX of the engine 2 is calculated on the basis of the engine speed NE and the absolute pressure PM. Namely, at this time, since the traction control is not carried out, the engine 2 outputs the maximum torque TMAX determined by the engine speed NE and the absolute pressure PM. This maximum torque TMAX is stored in the ROM 4b in the form of a map illustrated in FIG. 4. Then, in step 400, the maximum torque TMAX is memorized as the integral term TSI for the driven wheel target torque, and the processing routine is then completed.

Conversely, if $\Delta V > 0$, it is determined that the slippage of the driven wheel 52RR or 52RL has occurred. At this time, the routine goes from step 160 to step 170 and the flag F is set, and the routine goes to step 180 and the acceleration slippage control is started. Once the flag F is set, the routine jumps from step 150 to step 180 thereafter until the flag F is reset.

In step 180, the mean value VRO of the rotating speeds of the driven wheels 52RR and 52RL is calculated from the signals output from the driven wheel speed sensors 54RR and 54RL. Further, the engine speed NE is calculated from the output signal of the crankangle sensor 40, and the absolute pressure PM in the surge tank 10 is calculated from the output signal of the pressure sensor 30. Then, in step 190, the speed reduction ratio $\gamma$ (=NE/VRO) in the torque transmitting system between the engine 2 and the driven wheels 52RR, 52RL is calculated. This speed reduction rate $\gamma$ becomes larger as a reduction in speed in the torque transmitting system becomes larger.

Then, in step 200, the integral term TSI for the driven wheel target torque is renewed by the following equation.

$$TSI = TSI = GI \cdot \Delta V \ldots \quad (1)$$

where GI is a predetermined integral constant.

This integral term TSI becomes equal to the maximum torque TMAX before the routine initially goes to step 200 after $\Delta V$ becomes positive.

Then, in step 210, the proportional term TSP for the drive wheel target torque is calculated from the following equation.

$$TSP = -GP \cdot \Delta V \ldots \quad (2)$$

where GP is a predetermined proportional constant.

Then, in step 220, the driven wheel target torque TS is calculated by adding the integral term TSI and the proportional term TSP, and in step 230, the target output torque TE of the engine 2, which corresponds to the drive wheel target torque TS, is calculated by dividing the drive wheel target torque TS by the speed reduction rate $\gamma$. This target output torque TE indicates an output torque to which the output torque of the engine 2 must be reduced.

Figure 4:
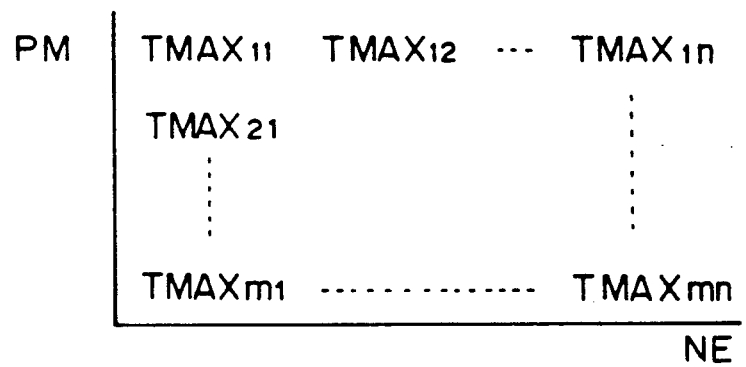
FIG. 4 is a view illustrating the map.

Then, in step 240, the maximum torque TMAX is calculated from the map illustrated in FIG. 4. Then, in step 250, the number of cylinders NS in which the supply of fuel should be stopped is calculated from the following equation.

$$NS = INT[KC \cdot \{1 - (TE/TMAX)\}] \ldots \quad (3)$$

where KC indicates the number of all of the cylinders (in this embodiment, KC=4), and INT indicates an integer obtained by eliminating figures below a decimal point in the brackets. Namely, in the above equation (3), $\{1-(TE/TMAX)\}$ indicates a rate of the output torque of the engine 2, which should be reduced, and thus $KC \cdot \{1-(TE/TMAX)\}$ indicates the number of the cylinders in which the supply of fuel should be stopped. Consequently, for example, if the result of the calculation of $[KC \cdot \{1-(TE/TMAX)\}]$ becomes equal to 2.65, this means that the supply of fuel into two point six five cylinders should be stopped. In this case, however, since the NC of the equation (3) becomes equal to 2, the rate of the output torque of the engine 2, which should be reduced, is still higher by 0.65.

Consequently, this excessive output torque must be reduced.

Then, in step 260, it is determined whether or not the calculated number of cylinders NS is larger than the actual number of cylinders NC in which the supply of fuel should be stopped. When $NS \leq NC$, the routine goes to step 265, and the calculated number of cylinders NS is memorized as the actual number of cylinders NC, and the routine goes to step 290. In step 290, a timer count CFCX is cleared, and then in step 295, the timer count CFCX is incremented by one.

Conversely, in step 260, when $NS > NC$, the routine goes to step 270, and it is determined whether or not the timer count CFCX is larger than or equal to a predetermined value LVOK. When $CFCX \geq LVOK$, the routine goes to step 280, and the calculated number of cylinders NS is memorized as the actual number of cylinders NC, and the routine goes to step 290. In step 270, when $CFCX < LVOK$, the routine jumps to step 295, and thus in this case NC is not changed.

Figure 5:
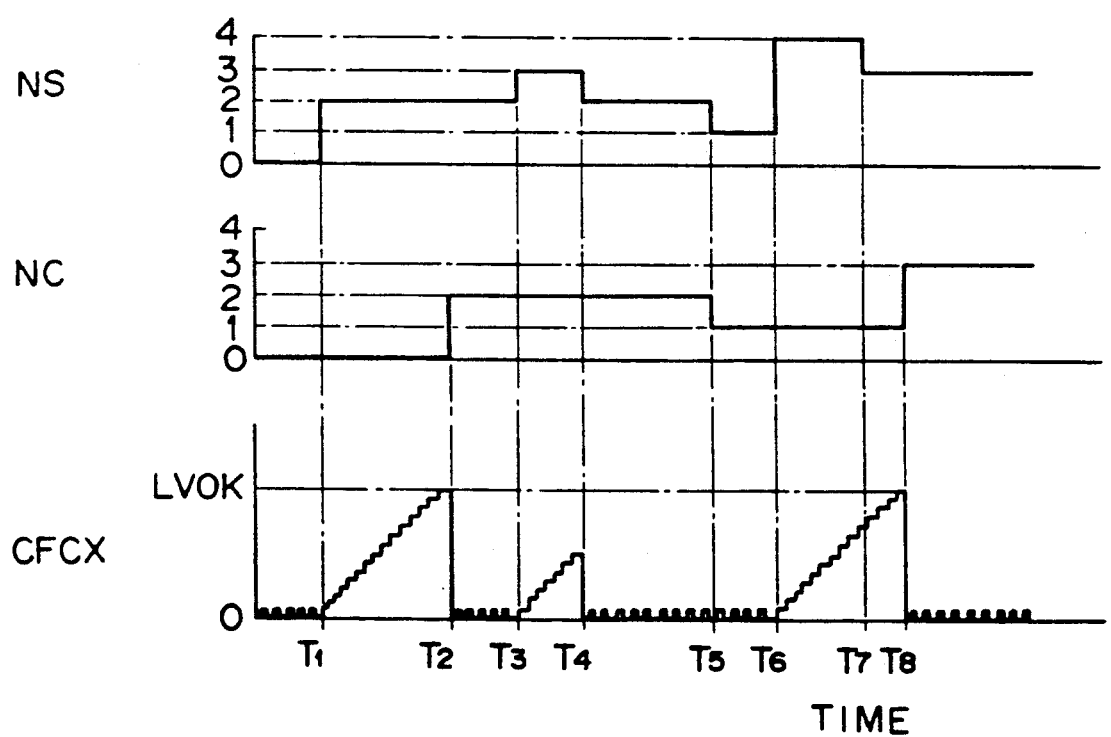
FIG. 5 is a time chart showing changes in the calculated number of the cylinders NS, the actual number of cylinders NC, and the timer counter.

FIG. 5 shows the changes of NS, NC, and CFCX. Referring to FIG. 5, when NS becomes equal to 2 at $T_1$, since CFCX is smaller than LVOK, NC is not changed. At this time, CFCX is gradually increased while NS is larger than NC, and when CFCX becomes equal to LVOK at $T_2$, NC is made equal to NS, i.e., 2. and CFCX is cleared. When NS becomes equal to 3 at $T_3$, since CFCX is smaller than LVOK, NC is not changed. At this time, CFCX is gradually increased while NS is larger than NC, and when NS again becomes equal to 2 at $T_4$, CFCX is smaller than LVOK immediately before $T_4$, NC is not changed but is maintained at 2. When NS becomes equal to 1 at $T_5$, NC is made equal to NS, i.e., 1. When NS becomes equal to 4 at $T_6$, since CFCX is smaller than LVOK, NC is not changed. At this time, CFCX is gradually increased while NS is larger than NC, and when NS becomes equal to 3 at $T_7$, since NS is still larger than NC, CFCX is still gradually increased. When CFCX becomes equal to LVOK at $T_8$, NC is made equal to NS, i.e., 3, and CFCX is cleared.

Namely, when the period in which NS is larger than NC continues for more than a predetermined time, NC is made equal to NS, which is larger than NC, i.e., NC is increased. Accordingly, even if NS fluctuates frequently within a relatively short time, due to a change of the severity of the slippage, NC is not fluctuated so frequently.

Figure 6:
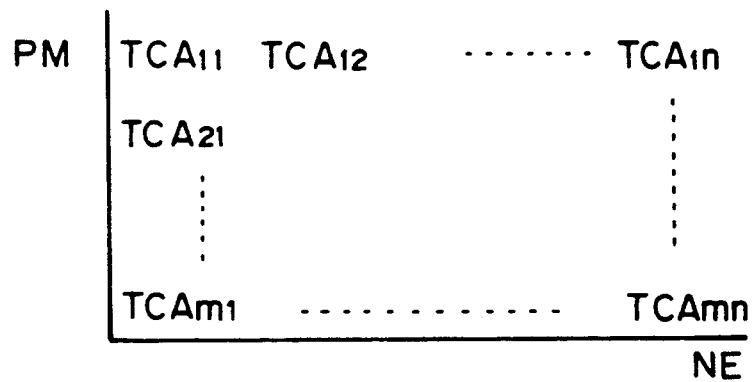
FIG. 6 is a view illustrating the map.

Then, in step 300, the output torque reduction rate TCA is calculated on the basis of the engine speed NE and absolute pressure PM. This output torque reduction rate TCA indicates a rate of the output torque of the engine 2, which can be reduced by retarding the ignition timing by one degree where fuel is fed into all of the cylinders, i.e., where the engine 2 is outputting the maximum torque TMAX. The output torque reduction rate TCA has been obtained by experiment and is stored in the ROM 4b in the form of a map illustrated in FIG. 6. In the next step 310, excessive output torque is reduced by retarding the ignition timing, and the retarding value $\Delta \theta$ of the ignition timing is calculated from the following equation.

$$\Delta\theta = 1 - \frac{TE}{TMAX} \cdot \frac{KC}{KC - NC} \cdot \frac{1}{TCA} \quad (4)$$

That is, $$\Delta\theta = 1 - \frac{TE}{TMAX \cdot \frac{KC - NC}{KC}} \cdot \frac{1}{TCA} \quad (4')$$

In the above equation (4'), $$TMAX \cdot \frac{KC - NC}{KC}$$

indicates the maximum torque obtained when the supply of fuel fed into the cylinders of NC units is stopped. Consequently, $$1 - \frac{TE}{TMAX} \cdot \frac{KC}{KC - NC}$$

indicates a part of the rate of the output torque of the engine 2, which part cannot be reduced by stopping the supply of fuel fed into the number of cylinders NC. Therefore, $\Delta\theta$ is the retarding value of the ignition timing able to reduce the above-mentioned part of the rate of the output torque of the engine 2.

After NC and $\Delta\theta$ are calculated as described above, the routine goes to step 320, and NC and $\Delta\theta$ are output to the output interface 4e. Then, NC and $\Delta\theta$ are input to the input interface 6d of the second electronic control unit 6, and the stopping of the supply of fuel and the retarding of the ignition timing are carried out.

Figure 7:
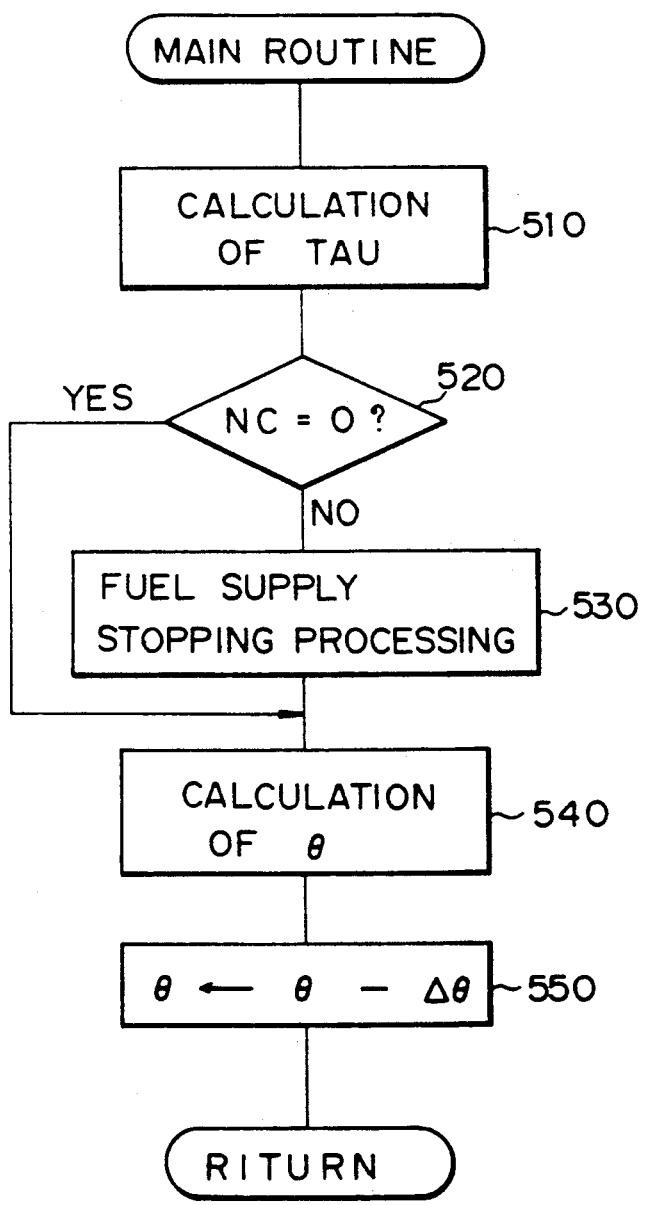
FIG. 7 is a flow chart of the first embodiment of the main routine.

FIG. 7 illustrates a main routine for executing these controls.

Referring to FIG. 7, in step 510, the optimum fuel injection time TAU is calculated, and in step 520, it is determined whether or not NC is equal to zero. When NC is not equal to zero, the routine goes to step 530, and the cylinders in which the supply of fuel is to be stopped is determined on the basis of NC. For example, if NC=1, the supply of fuel fed into the cylinder in which the next fuel injection is to be carried out remains stopped. If NC=2, the supply of fuel fed into two cylinders in which the next fuel injection and the successive fuel injection are to be carried out remains stopped. Namely, if NC=i, the supply of fuel fed into i cylinders remains stopped.

In step 540, the optimum ignition timing $\theta$ is calculated, and then in step 550 the actual ignition timing $\theta$ is calculated by subtracting $\Delta\theta$ from the optimum ignition timing $\theta$.

Turning to FIG. 3, in the next step 330 it is determined whether or not $\Delta V$ is smaller than zero. If $\Delta V>0$, i.e., when the slippage of the driven wheels 52RR or 52RL is still occurring, the processing cycle is completed, and thus the acceleration slippage control is still carried out.

Conversely, if $\Delta V \leq 0$, i.e., when the slippage of the driven wheels 52RR or 52RL has ceased, the routine goes to step 340 and the count value C is incremented by one. Then, in step 350 it is determined whether or not the count value C exceeds a predetermined value $C_0$. If $C>C_0$, it is determined that the slippage of the driven wheels 52RR or 52RL will not occur again. Consequently, at this time, the routine goes to step 360, and the output of NC and $\Delta\theta$ is stopped. At this time, in the main routine illustrated in FIG. 4, it is determined that both NC and $\Delta\theta$ are equal to zero, and the routine then goes to step 370.

As mentioned above, in this embodiment, since NC is not made equal to NS which is larger than NC, until a predetermined time has elapsed from the time at which NS became larger than NC, even if NS becomes temporarily larger than NC within a short time, NC is not changed. i.e., NC is not increased. Therefore, it is possible to prevent frequent fluctuations in the number of engine cylinders in which the supply of fuel is stopped and accordingly, it is possible to prevent damage to parts of the exhaust system and frequent backfiring. Note, the noise level is reduced by preventing backfiring.

Furthermore, since NC is easily reduced but is not easily increased NC can easily converge to 0. Namely, the acceleration slippage control can be smoothly terminated. Further, the target torque TE may be calculated directly from $\Delta V$, by using a map.

Furthermore, by using a detecting device for detecting the friction coefficient of a road by detecting the roughness of the surface of the road by ultrasonic waves reflected from the road surface, or by using a manual switch for determining the friction coefficient of a road by choosing the state of the road, i.e., snow, rain or icing, $\Delta V$ may be calculated from the friction coefficient of the road and the rotating speeds of the driven wheels 52RR and 52RL.

Figure 8:
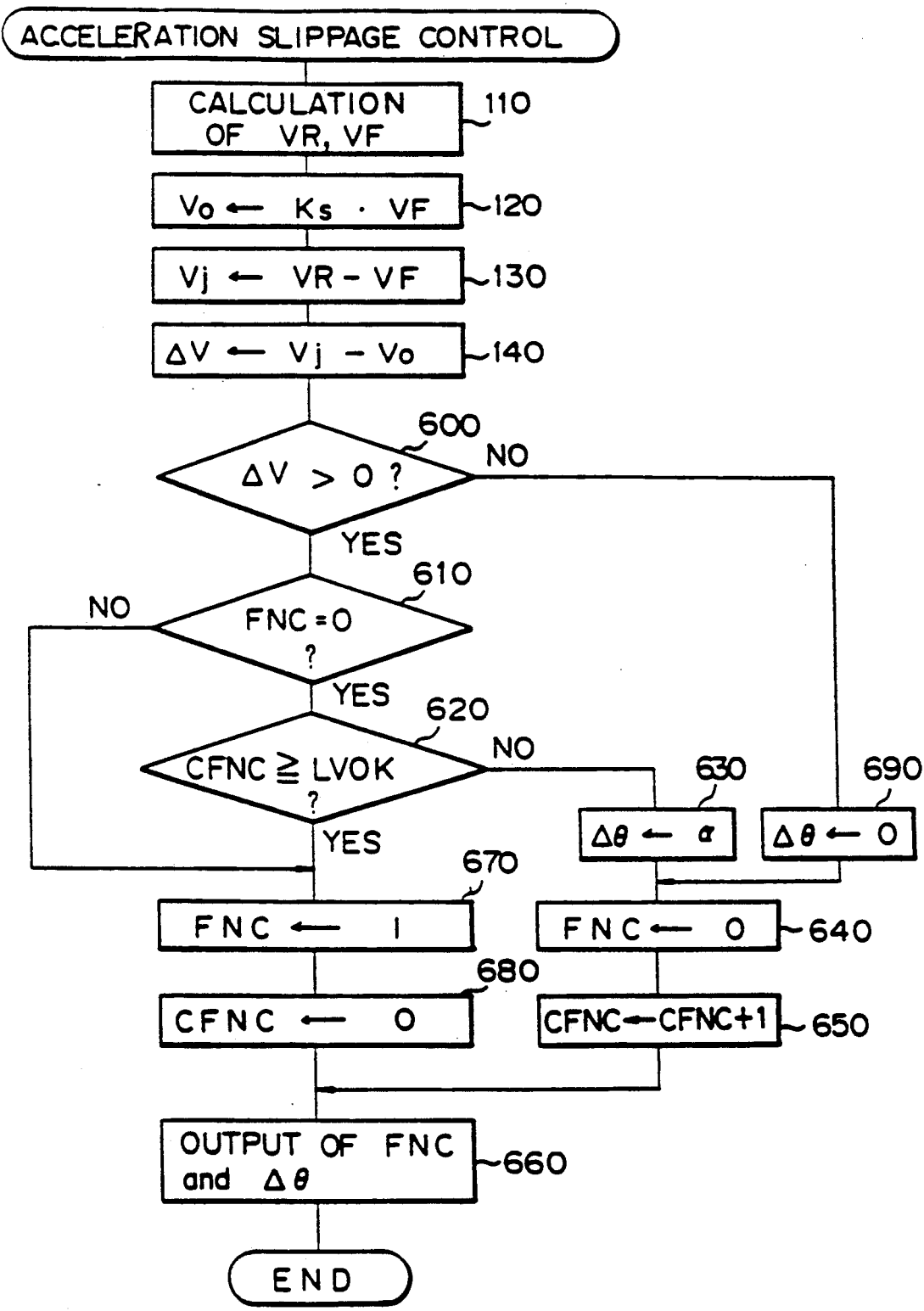
FIG. 8 is a flow chart of the second embodiment for executing the acceleration slippage control.

FIG. 8 illustrates a routine for executing the acceleration slippage control according to a second embodiment of the present invention, and this routine is processed by sequential interruptions executed at predetermined intervals in the first electronic control unit 4.

Referring to FIG. 8, the routine from step 110 to step 140 is the same as the routine of step 110 through step 140 of FIG. 3, a description of these steps is omitted. In step 600, it is determined whether or not the speed difference $\Delta V$ is positive. If $\Delta V>0$, it is determined that the slippage of the driven wheel 52RR or 52RL has occurred. At this time, the routine goes to step 610, and it is determined whether or not the fuel supply stopping flag FNC is equal to 0. If FNC=0, the routine goes to step 620 and it is determined whether or not the timer count CFNC is larger than or equal to the predetermined value LVOK. When CFNC<LVOK, the routine goes to step 630, and the retarding value $\Delta\theta$ of the ignition timing is made equal to a predetermined value $\alpha$. Then, in step 640, a fuel supply stopping flag FNC is reset. Namely, when $\Delta V$ is positive and FNC is equal to 0 (i.e., a stopping of the supply of fuel to all of the cylinders is not carried out), the ignition timing is retarded. Then, in step 650, a timer count CFNC is incremented by 1, and in step 660, FNC and $\Delta\theta$ are output to the output interface 4e. Then, FNC and $\Delta\theta$ are input to the input interface 6d of the second electronic control unit 6, and the processing routine is completed.

Figure 9:
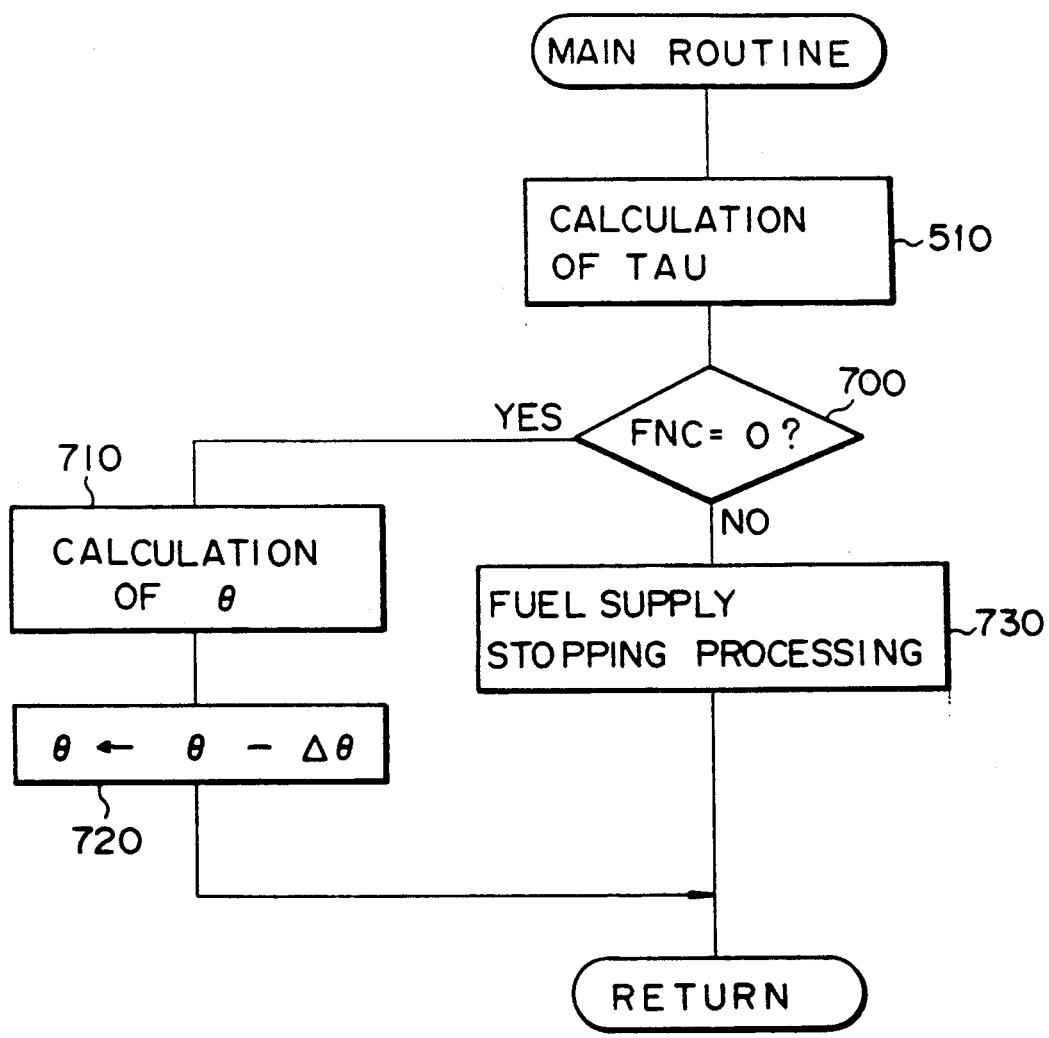
FIG. 9 is a flow chart of the second embodiment of the main routine.

FIG. 9 illustrates a main routine for executing the controls of stopping the supply of fuel to all of the cylinders and retarding the ignition timing.

Referring to FIG. 9, in step 510 the optimum fuel injection time TAU is calculated, and then in step 700, it is determined whether or not FNC is set. When FNC is reset, the routine goes to step 710 and the optimum ignition time $\theta$ is calculated. Then, in step 720, the actual ignition timing $\theta$ is calculated by subtracting $\Delta\theta$ from the optimum ignition timing $\theta$.

Conversely, in step 700, when FNC is set, the routine goes to step 730 and the supply of fuel to all of the cylinders remains stopped.

Turning to FIG. 8, in step 620, when CFNC becomes larger than or equal to LVOK, the routine goes to step 670 and FNC is set. Then, in step 680, CFNC is cleared.

In step 610, when FNC is not set the routine jumps to step 670. Namely, once FNC is set, the routine jumps from step 610 to step 670 thereafter until FNC is reset.

Conversely, in step 600, if $\Delta V \leq 0$, it is determined that the slippage of the driven wheels 52RR or 52RL has not occurred, and the routine goes to step 690. In step 690, $\Delta \theta$ is made equal to zero, and then in step 640, FNC is reset.

FIG. 10 illustrates changes of $\Delta V$, FNC, $\Delta \theta$, and CFNC. Referring to FIG. 10, $\Delta V$ is not positive until $T_{10}$, and accordingly, FNC is reset, $\Delta \theta$ is made equal to zero, and CFNC is gradually increased. When $\Delta V$ becomes positive at $T_{10}$, since CGNC is larger than LVOK, FNC is set and CFNC is cleared. Therefore, the supply of fuel all of the cylinders is stopped. When $\Delta V$ becomes equal to or smaller than zero at $T_{11}$, FNC is reset and CFNC starts counting. When $\Delta V$ again becomes positive at $T_{12}$, since CFNC is smaller than LVOK, FNC remains reset. At this time, $\Delta \theta$ is made equal to $\alpha$. In this embodiment, although $\alpha$ is a constant value, $\alpha$ may be variable. At $T_{13}$, since CFNC becomes equal to LVOK, FNC is set and CFNC is cleared. At this time, in this embodiment, although, $\Delta \theta$ is maintained at $\alpha$, $\Delta \theta$ may become made equal to zero. When $\Delta V$ becomes equal to or smaller than zero at $T_{14}$, FNC is reset, $\Delta \theta$ is made equal to zero, and CFNC starts counting. When $\Delta V$ becomes positive at $T_{15}$, since CFNC is smaller than zero at LVOK, FNC remains reset. LVOK and FNC remain reset. At this time, $\Delta \theta$ is made equal to $\alpha$. When $\Delta V$ becomes equal to or smaller than zero at $T_{16}$, $\Delta \theta$ is made to equal to zero, and at this time, CFNC is still increased. When $\Delta V$ again becomes positive at $T_{17}$, since CFNC is larger than LVOK, FNC is set and CFNC is cleared.

Namely, CFNC counts while FNC is reset, and when the period in which FNC is reset continues for more than a predetermined time, FNC is set. Accordingly, even if $\Delta V$ frequently fluctuates within a relatively short time, FNC does not fluctuate as frequently. Therefore, it is possible to prevent frequent repetitions of an alternative supply and prohibition of a supply of fuel to all of the cylinders. Accordingly, it is possible to prevent damage to parts of the exhaust system and to prevent frequent backfiring.

Furthermore, effects similar to the effects obtained according to the first embodiment are obtained.

While the invention has been described by reference to specific embodiments chosen for purposes of illustration, it should be apparent that numerous modifications could be made thereto by those skilled in the art without departing from the basic concept and scope of the invention.

We claim:

1. A traction control device of a vehicle having a free running wheel and a driven wheel driven by an engine having a plurality of cylinders, a fuel supply device for the cylinders and an ignition device for the cylinders, said traction control device comprising:

means for detecting the rotating speed of the free running wheel;
   means for detecting the rotating speed of the driven wheel;
   speed difference calculating means for calculating a speed difference between the rotating speed of the free running wheel and the rotating speed of the driven wheel;
   cylinder number determining means for determining the number of the cylinders to which a supply of fuel is t be stopped in accordance with said speed difference;
   fuel supply controlling mean for controlling the supply of fuel to the cylinders in accordance with said determined number of cylinders; and
   prohibiting means for prohibiting an increase in an actual number of cylinders to which the supply of fuel is stopped by said fuel supply controlling means, said prohibiting means prohibiting an increase in said actual number of cylinders until a predetermined time has elapsed from a time at which said actual number of the cylinders was changed.

2. A traction control device according to claim 1, wherein said determined number of cylinders is equal to either zero or all of the cylinders of the engine.

3. A traction control device according to claim 2, wherein, when the actual number of cylinders to which the supply of fuel is stopped is equal to zero, said prohibiting means prohibits a change of said actual number of cylinders to all of the cylinders of the engine until a predetermined time has elapsed from a time at which said actual number of cylinders became zero.

4. A traction control device according to claim 1, wherein said prohibiting means further prohibits a decrease in said actual number of cylinders.

5. A traction control device according to claim 1, wherein said prohibiting means prohibits an equalizing of said actual number of cylinders with said determined number of cylinders until a predetermined time has elapsed from a time at which said determined number of cylinders became larger than said actual number of cylinders.

6. A traction control device according to claim 1, wherein said cylinder number determining means determines the number of cylinders to which the supply of fuel is to be stopped in accordance with an overall rate of reduction in the output torque of the engine to be reduced.

7. A traction control device according to claim 6, wherein said overall rate of reduction is determined by said speed difference and a ratio of an engine speed to the rotating speed of the driven wheel and is increased as said speed difference becomes larger, and said overall rate of reduction is increased as said ratio is decreased.

8. A traction control device according to claim 6, wherein said determined number of cylinders to which the supply of fuel is to be stopped is determined from the following equation.

$$NS = INT(KC \cdot \Delta R)$$

where
   NS: the determined number of the cylinders to which the supply of fuel is to be stopped.
   KC: the number of all of the cylinders.
   $\Delta R$: said overall rate of reduction.
   INT: a symbol indicating a function of eliminating the figures of (KC·$\Delta R$) below a decimal point.

9. A traction control device according to claim 6, further comprising ignition control means for retarding an ignition timing when said speed difference is larger than a predetermined value.

10. A traction control device according to claim 9, wherein said ignition control means retards the ignition timing only when the supply of fuel is not stopped.

11. A traction control device according to claim 9, wherein said ignition control means retards the ignition timing by a degree which will cause a reduction in a part of said overall rate of reduction, which can not be reduced by stopping the supply of fuel.

12. A traction control device according to claim 11, wherein a rate of reduction of the output torque of the engine, which rate is caused by retarding the ignition timing by a unit of degrees, is stored in a memory, and a retarding value of the ignition timing is calculated from said part of said overall rate of reduction and said rate of reduction stored in said memory.

13. A traction control device according to claim 9, wherein the retarding of the ignition timing is constant.

* * * * *

UNITED STATES PATENT AND TRADEMARK OFFICE
CERTIFICATE OF CORRECTION

PATENT NO. : 5,099,942
DATED : 31 March 1992
INVENTOR(S) : Naoto KUSHI et al.

It is certified that error appears in the above-indentified patent and that said Letters Patent is hereby corrected as shown below:

| Column | Line |  |
|---|---|---|
| 3 | 61 | Change "RR" to --52RR--. |
| 4 | 39 | Change "2RL" to --52RL--. |
| 5 | 27 | Change "$TSI=TSI=GI \cdot \Delta V...$" to --$TSI=TSI-GI \cdot \Delta V...$--. |
| 5 | 68 to | |
| 6 | 1 | Change "two point six five" to --2.65--. |
| 6 | 1-5 | Delete indents. |
| 6 | 32 | Change "2." to --2--. |
| 7 | 2 | Change "$\Delta \theta =^{1}-$" to --$\Delta \theta =1-$ --. |
| 9 | 19 | Change "CGNC" to --CFNC--. |
| 9 | 21 | After "fuel" insert -- to--. |
| 9 | 30 | After "become" delete "made". |
| 10 | 7 | After "is" change "t" to --to--. |
| 10 | 9 | Change "mean" to --means--. |

UNITED STATES PATENT AND TRADEMARK OFFICE
CERTIFICATE OF CORRECTION

PATENT NO. : 5,099,942

DATED : March 31, 1992

INVENTOR(S) : Naoto Kushi, et. al.

It is certified that error appears in the above-indentified patent and that said Letters Patent is hereby corrected as shown below:

| Column | Line | |
|---|---|---|
| 10 | 58 | Change "$NS=INT(KC \neq \Delta R)$ to --$NS=INT(KC \cdot \Delta R)$ |

Signed and Sealed this

Twenty-eighth Day of September, 1993

Attest:

BRUCE LEHMAN

*Attesting Officer*     *Commissioner of Patents and Trademarks*